Feb. 21, 1956     E. W. NICKOLAY     2,735,925

WATER HEATER

Filed May 19, 1953

Edward W. Nickolay
INVENTOR.

United States Patent Office 2,735,925
Patented Feb. 21, 1956

2,735,925
WATER HEATER
Edward W. Nickolay, Park River, N. Dak.
Application May 19, 1953, Serial No. 355,903
1 Claim. (Cl. 219—43)

This invention relates to a water heater and particularly to an urn-type heater to be mounted on a bar or other location for providing hot water for mixing hot drinks.

In the operation of hot water heaters in the preparation of hot drinks considerable difficulty has heretofore been experienced. Heretofore considerable difficulty has also been experienced because of the leaking of the containers and the consequent ruining of the heating element or the burning out of the heating element and the ruining of the container.

Also, in the operation of urn-type water heaters considerable difficulty has been experienced because of the leaking of the faucets which will cause dripping of hot water on the bar and consequent ruining of the finish. Also, the deposit of various materials in the spigots causes spigots to operate with unnecessary friction so that either the spigot becomes broken ruining the container or the spigot fails to close so that there will be a constant drip therethrough.

The present invention provides an improved type water heater having a separable container and a heating chamber with the entire structure mounted on trunnions so that the liquid may be poured from a spout or spouts in the container so that there will be no necessity of spigots.

Accordingly, an object of my invention is to provide an improved water heater.

It is a further object of the invention to provide a water heater mounted on trunnions.

It is a further object of the invention to provide a water heater having a separable liquid container and heating chamber.

Other objects and many of the attendant advantages of the present invention will be apparent from the following detailed description taken in conjunction with the accompanying drawings, in which.

Figure 1:
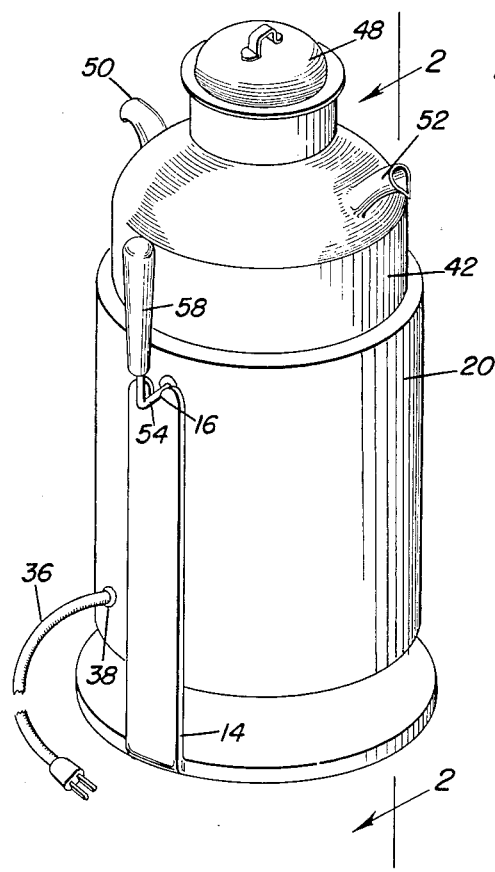
Figure 1 is a perspective view of a water heater according to the invention.
Figure 2:
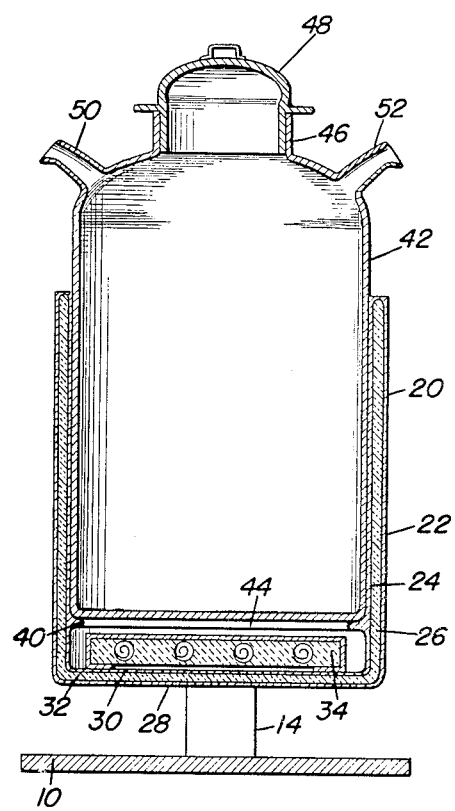
Figure 2 is a sectional elevation of the water heater taken substantially on the plane indicated by the line 2—2 of Figure 1.
Figure 3:
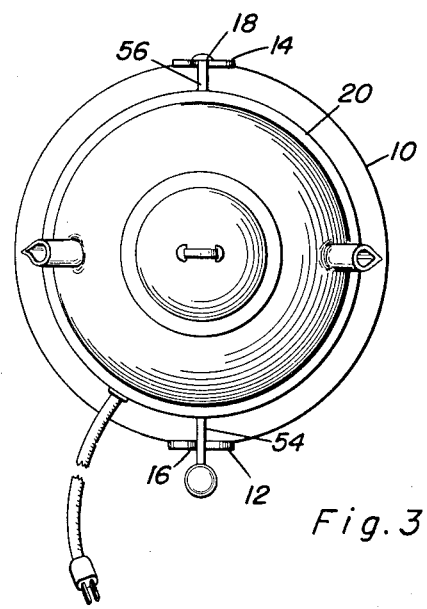
Figure 3 is a top plan view of the water heater.

In the exemplary embodiment according to the invention a bottom support platform 10 may be of any desired shape and herein shown as circular for supporting the entire structure on the bar or other furniture. A pair of upstanding standards or arms 12 and 14 are mounted in spaced relation on the platform 10 and are herein shown as substantially integral arms extending upwardly in parallel relation. The tops of the arms 12 and 14 are provided with recessed bearing elements 16 and 18.

The heating element itself comprises a substantially cylindrical container 20 having an outer wall 22 and an inner wall 24 providing a space therebetween for the reception of thermal insulating material 26. The bottom end of the cylinder is likewise provided with an outer shell member 28 and an inner shell member 30 providing a space for the enclosing of the thermal insulating material 32 which may be and preferably is continuous with the thermal insulating material 26 in the side walls.

An electrical heating element 34 is removably mounted on the interior of the bottom portion of the heating chamber and is provided with a connector cord 36 for plugging in to any suitable outlet. Preferably the connector cord 36 passes through a suitable grommet 38 placed in an aperture adjacent the bottom of the heating chamber 20.

The inner wall 24 of the chamber 20 is provided with an inwardly extending ledge 40 adapted to provide a seat for the liquid container 42 so that the bottom 44 of the container 42 will be mounted in closely spaced relation to the top of the heating element 34. Also, it is preferable that the container 42 fits snugly within the inner wall 24 of the heating chamber so that little if any heat will escape between the container 42 and the inner wall 24.

The container 42 is preferably provided with a collar 46 providing a filling hole for the top of the container 42 and having a lid 48 preferably in friction engagement with the collar 46 so that it is relatively firmly fixed but removable therefrom. A plurality of spouts 50 and 52 are provided on opposite sides of the container 42 so that liquid may be poured in either direction by tilting the container. For purpose of tilting the container a pair of trunnions 54 and 56 are mounted on the chamber 20 adjacent the top thereof and extending outwardly therefrom. These trunnions 54 and 56 are mounted in the bearing recesses 16 and 18 so that the chamber 20 is free to swing between the standards 14 and 16. An angularly disposed handle 58 is fixed to one of the trunnions such as 54 so that the entire device including the heater 42 may be readily swung about the trunnions 54 and 56 to cause liquid in the container 42 to pour from either the spout 50 or 52 as may be desired.

It will thus be apparent that the present invention provides a water heater in which the containers for the liquid and the heating element are separable and individually replaceable if necessary. Further, the device is mounted for tilting movement so that liquid may be poured from the container in either direction without the interposition of a spigot which is apt to be corroded or broken during use.

While for purposes of exemplification a particular embodiment of the invention has been shown and described according to the best present understanding thereof, it will be apparent to those skilled in the art that many changes and modifications may be made in the construction and arrangement of the parts thereof without departing from the true spirit or scope of the invention.

What is claimed as new is as follows:

A liquid heater comprising a stand having a pair of spaced apart standards provided with upwardly opening recesses in upper ends thereof, a substantially cylindrical heating chamber having hollow insulation filled side and bottom walls, an internal annular ledge in said heating chamber adjacent its bottom wall, a heating element in said heating chamber mounted on said bottom wall below said ledge, a substantially cylindrical liquid container with a closed top and slidably fitting in said heating chamber to rest on said ledge, a pair of oppositely extending pouring spouts on the top of said liquid container at opposite sides thereof, and a pair of lateral trunnions on the side wall and adjacent the top and at opposite sides of the heating chamber at a right angle to said spouts rotatably seating in said recesses for swinging in opposite directions of said heating chamber between said standards to tilt the liquid container in opposite directions for pouring out of said spouts selectively while being heated.

References Cited in the file of this patent

UNITED STATES PATENTS

| 1,530,416 | Saeki | Mar. 17, 1925 |
| 1,806,004 | Tavender | May 19, 1931 |
| 2,547,067 | Waline | Apr. 3, 1951 |

FOREIGN PATENTS

| 103,183 | Switzerland | Jan. 16, 1924 |
| 454,824 | Great Britain | Oct. 8, 1936 |